3,283,485
DRIVE SYSTEM FOR AGRICULTURAL MACHINE
Earl E. Koch, Mohnton, and Daniel C. Heitshu, Shippensburg, Pa., assignors to Sperry Rand Corporation, New Holland, Pa., a corporation of Delaware
Filed May 25, 1964, Ser. No. 369,912
14 Claims. (Cl. 56—23)

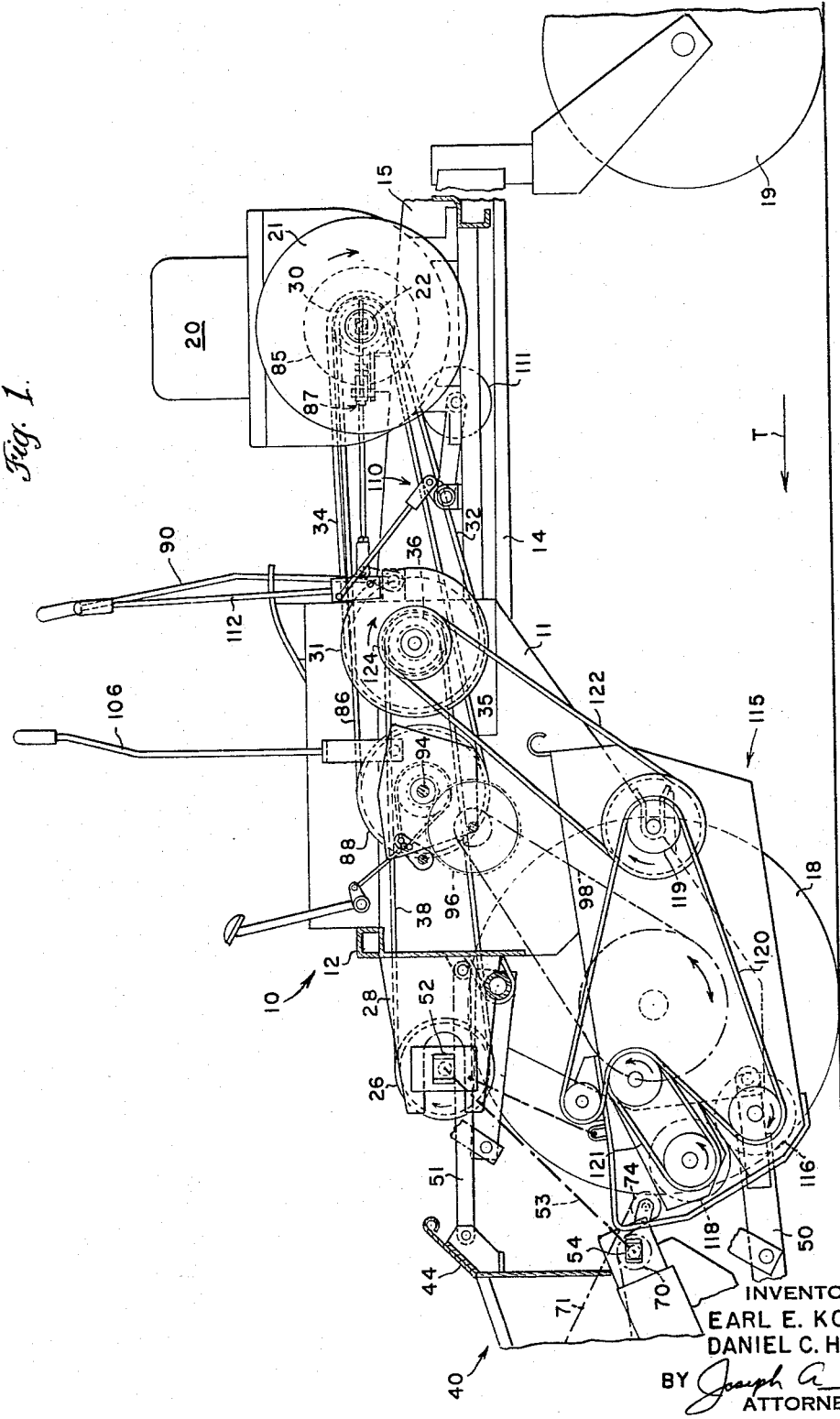

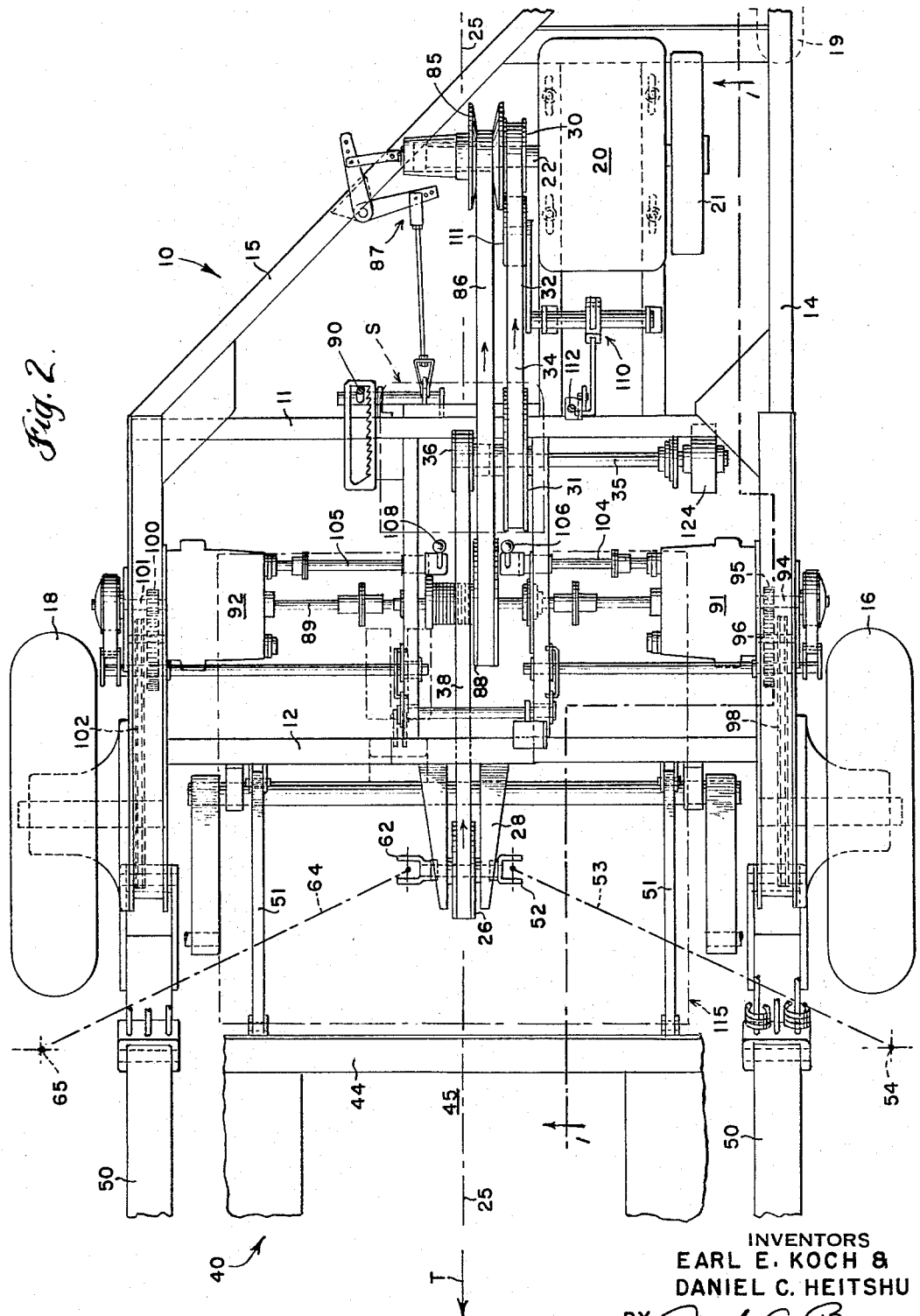

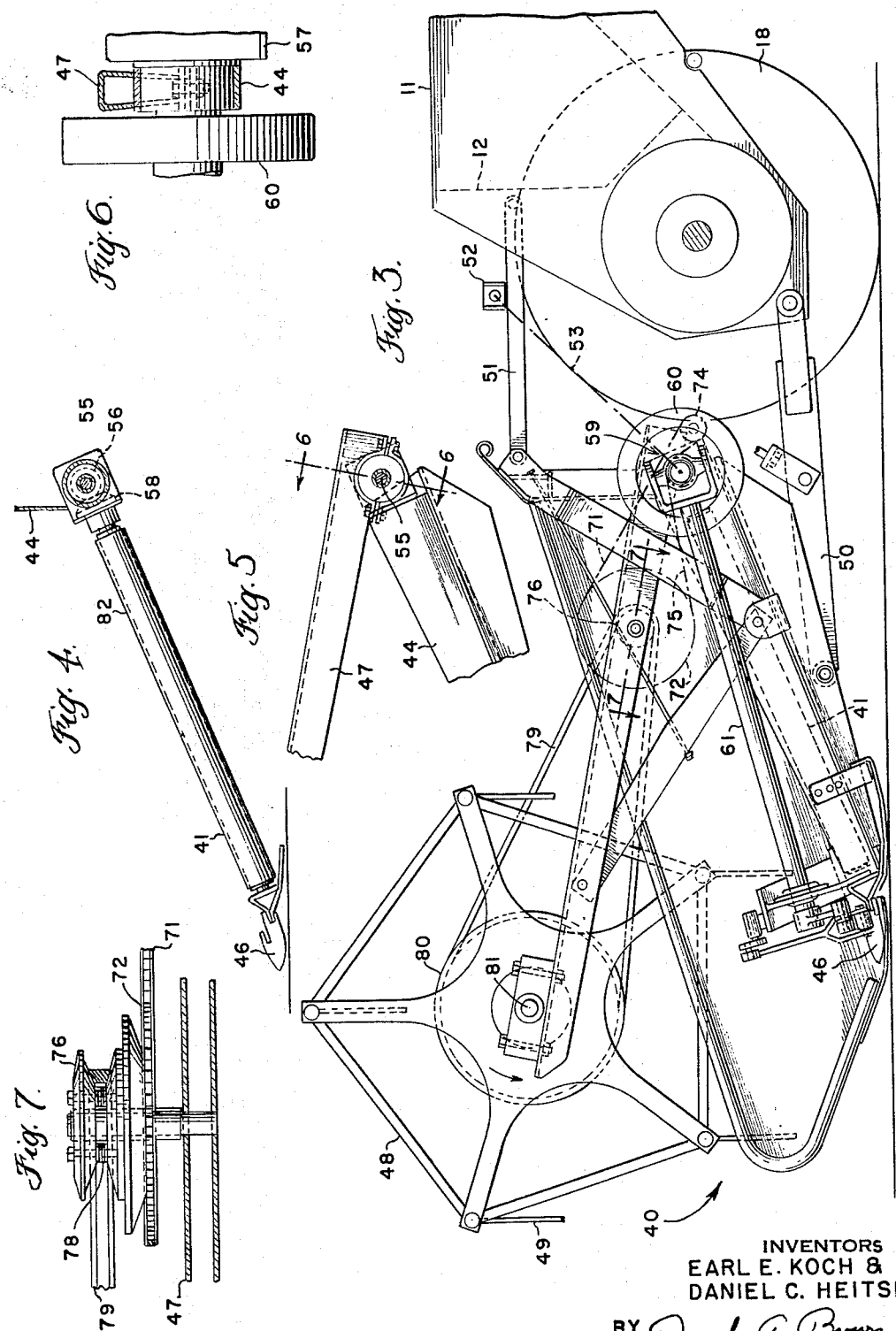

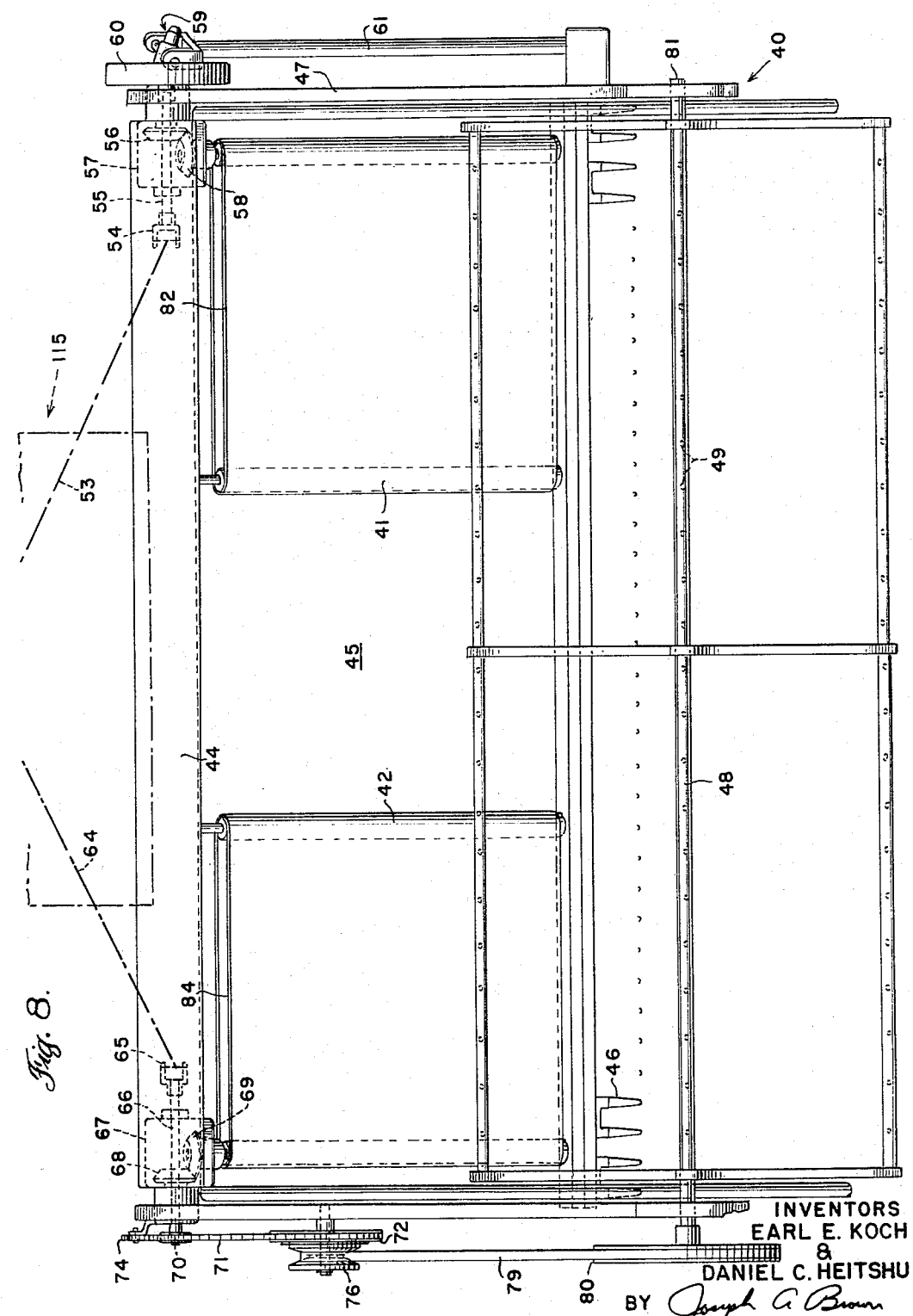

This invention relates to agricultural machines commonly referred to as windrowers or swathers. Such machines cut standing crops, consolidate the material after it has been cut, and then deposit the material in a windrow.

The conventional windrower has a frame shaped like a right triangle when viewed in plan. The frame forward end has a transverse section supported on a pair of coaxial laterally spaced drive wheels. One of the wheels is adjacent the right angle of the frame at the left side of the machine. The hypotenuse of the frame extends rearwardly and diagonally from the other wheel at the right side of the frame to a location where it meets a fore-and-aft frame member. At such location, a caster wheel is provided. The caster wheel is generally in trailing relation to the left ground wheel. The engine which drives the windrower is supported along the left side of the frame between the caster wheel and the left drive wheel. The output shaft of the engine extends parallel to the axes of the drive wheels and projects laterally outwardly to the left of the machine frame. The drive train from the shaft extends along the same side of the frame and substantially offset laterally from a central plane midway between the two drive wheels.

With the conventional drive arrangement, the portion of the wheeled frame between the caster wheel and the left ground wheel carries a major portion of the weight. Further, the operator's station is commonly directly above the drive train and thus offset to one side of the middle of the machine. From such a position, the operator has a relatively poor vantage point and problems are presented in properly steering the machine and closely following the previously cut swath. The situation is complicated by the fact that the header on a windrower is sometimes sixteen feet wide, or more.

A main object of this invention is to provide an improved drive system for a windrower.

Another object of this invention is to provide a drive system for a windrower whereby there is an improved weight distribution throughout the frame structure, whereby the machine has better balance and more field stability than windrowers of prior design.

Another object of this invention is to provide a windrower drive having components midway between two ground wheels and symmetrically arranged to provide a balanced drive system.

Another object of this invention is to provide a symmetrical drive system for a windrower wherein most of the drive components to the right of a longitudinal center line of the machine have the same components to the left of such line, and the parts being interchangeable.

A further object of this invention is to provide a windrower drive system of the character described wherein the torque forces at one side of the system are balanced by similar forces at the opposite side thereby providing long operative life, uniform wear and desirable drive characteristics.

A still further object of this invention is to provide a drive system of the character described wherein the operator seat is located exactly midway between the two drive wheels of the frame for optimum viewing and control.

Other objects of this invention will be apparent hereinafter from the specification and from the recital in the appended claims.

In the drawings:
FIG. 1 is a fragmentary longitudinal vertical sectional view of a windrower having a drive system constructed according to this invention, such section being taken generally on the lines 1—1 of FIG. 2 looking in the direction of the arrows;

FIG. 2 is a plan view of FIG. 1;

FIG. 3 is a side elevational view of the header of the windrower and showing the drive components to the sickle and the reel thereon;

FIG. 4 is a fragmentary view on an enlarged scale showing one of the draper elements and the bevel drive therefor;

FIG. 5 is an enlarged fragmentary view showing the mounting structure for one of the reel arms;

FIG. 6 is an enlarged section taken on the line 6—6 of FIG. 5 looking in the direction of the arrows;

FIG. 7 is an enlarged plan section on the line 7—7 of FIG. 3 looking in the direction of the arrows; and FIG. 8 is a generally diagrammatic plan view of the windrower header and showing the drive components therefor.

Referring now to the drawings by numerals of reference, and particularly to FIGS. 1 and 2, 10 denotes generally a windrower having a right angle frame 11 including a forward transverse member 12, a fore-and-aft extending member 14 and a diagonal member 15. Frame 11 is supported at its forward end on a pair of laterally spaced coaxial ground wheels 16 and 18 and the rearward end of the frame is supported on a caster wheel 19. The caster wheel 19 is positioned generally in trailing relation to forward ground wheel 16 and rotatably supported in a location where frame member 14 meets member 15. The windrower is adapted to travel forwardly to gather crop material, such direction being indicated by the arrow T.

Mounted on frame 11 is an engine 20 located forwardly and inwardly of caster wheel 19. Engine 20 has an outside flywheel 21 facing frame member 14 and an output shaft 22 extending inwardly and parallel to the axis of rotation of ground wheels 16 and 18. Shaft 22 extends across a longitudinal vertical plane 25 midway between the ground wheels. In front of the forward end of frame 11, a central main drive wheel or pulley 26 is rotatably supported on arms 28 connected to frame member 12. Pulley 26 rotates on a transverse horizontal axis and it extends in a plane located along the medial central plane 25.

For driving pulley 26, output shaft 22 of engine 20 has a sheave 30 connected to a sheave 31 by an endless belt 32. The output shaft 22 of the engine rotates in a clockwise direction when viewed as shown in FIG. 1. The upper reach 34 of belt 32 therefor travels rearwardly as indicated by the arrow on the belt. A transverse shaft 35 is rotatably carried on the frame 11 and is driven by the pulley 31. At its inboard end, shaft 35 carries a pulley 36 located on medial plane 25 and connected by endless belt 38 to the central pulley 26. When viewed as shown in FIG. 1, belt 38 travels in a clockwise direction, with its upper reach moving rearwardly.

Mounted on frame 11 is a header 40 which extends transversely in front of ground wheels 16 and 18. The header is connected to the frame 11 by means including lower support arms 50 and upper support arms 51. Header 40, as shown best in FIGS. 3 and 8, has a pair of spaced draper conveyors 41 and 42 which are rotatably carried on a header frame structure 44. When viewed as shown in FIG. 8, the draper 41 delivers material to the left and draper 42 delivers material to the right to a central open location 45. Across the front of the header is a reciprocable sickle 46 over which a reel 48 is rotatable.

The reel is carried on support arms 47 projecting upwardly and forwardly relative to header frame 44. As shown best in FIG. 3, the reel has fingers 49 which sweep downwardly over sickle 46 on counterclockwise rotation of the reel to move standing crop material over the sickle and then deposit the cut material onto drapers 41 and 42.

At one side of central pulley 26, one element 52 of a universal joint is provided (FIG. 2) and connected by diagonal shaft 53, shown in dotted lines, to a universal joint 54 adjacent the left side of the machine facing forwardly. Joint 54 is connected to a transverse shaft section 55 which carries a bevel gear 56. Gear 56 meshes with a bevel gear 58 rotatable about a fore-and-aft axis and operative to drive draper 41. Both gears are located within a gear box 57 on header frame 44. At its outboard end, shaft 55 has a conventional wobble drive unit 59 connected to it and a flywheel 60. The wobble drive changes rotation to oscillation and operates through shaft 61 extending forwardly to reciprocate the header sickle 46.

At the opposite side of central pulley 26, a universal joint 62 is provided and connected through diagonal shaft 64 (shown in dotted lines) to a universal joint 65 adjacent the right side of the machine facing forwardly. Joint 65 is connected to a transverse shaft section 66 having a bevel gear 68 meshing with a bevel gear 69 within gear box 67. Gear 69 rotates on a fore-and-aft axis and drives draper 42. The outer end of shaft 66 carries a sprocket 70. An endless chain 71 extends around a sprocket 72 and around a sprocket 74. The outside of the lower reach 75 of the chain passes over drive sprocket 70. In this way, the direction of rotation of the drive from sprocket 70 is reversed.

Coaxial with sprocket 72 is a pulley 76 (FIG. 7) which is an adjustable sheave. Shims 78 are provided between the halves of the pulley to establish its operative position. Pulley 76 is connected by an endless belt 79 to a pulley 80 on the shaft 81 of reel 48 to thereby rotate the reel. The adjusted position of pulley 76 by shims 78 establishes the rotatable speed of the reel. The operator establishes a desired ratio of reel speed to draper and sickle speeds, depending upon the crop being harvested.

The clockwise rotation of the central pulley 26 does not affect the drive to the sickle 46. The wobble drive 59 to the sickle translates such motion into a reciprocating action, and whether the input is clockwise or counterclockwise is immaterial. However, in the drive from central pulley 26 to reel 48, the direction of rotation must be changed to have the fingers 49 of the reel sweep rearwardly over sickle 46. This reversal is obtained through the outside engagement of chain 71 with drive sprocket 70. Also, it will be noted in FIG. 8 that of the two bevel gears for each draper section, the gear which rotates on the transverse axis is more remote from central plane 25 than the gear which rotates on the axis parallel to the direction of travel of the machine. With the bevel gears, the upper reach 82 of draper 41 travels toward the left when viewed as shown in FIG. 8 while the upper reach 84 of draper 42 travels toward the right. Cut material is thus consolidated and merged into space 45.

In addition to sheave 30 on the output shaft 22 of engine 20, a split sheave 85 is provided (FIG. 2) and connected by an endless belt 86 to a split sheave 88 carried on a transverse jack shaft 89. The upper reach of the belt 86 travels rearwardly. The adjusted position of split sheave 85 and thus the speed of sheave 88 is controlled by a bell crank mechanism shown at 87 and operated by handle 90.

At one end of the jack shaft 89, a planetary gear box 91 is provided through which power is transmitted to wheel 16, and at the opposite end of the shaft a planetary gear box 92 is provided to wheel 18. The output shaft 94 of gear box 91 has a spur gear 95 meshing with a gear 96 operable through drive chain 98 to rotate wheel 16. Similar spur gears 100 are provided on the output shaft 101 of the gearbox 92 to operate a chain 102 to drive ground wheel 18. The spur gears reverse the direction of rotation of the output of shaft 89 and the planetary gear boxes. Thus, even though the upper reach of belt 86 travels rearwardly or clockwise (FIG. 1) the wheels 16 and 18 travel forwardly and rotate counterclockwise. Control shafts 104 and 105 are provided to the gear boxes 91 and 92, respectively, and controllable by levers 106 and 108 respectively to reverse the drive to the wheels. Such reversal is obtained in the gear boxes by a conventional reverse drive gear train and band, not shown.

The drive belt 32 from engine 20 to the central pulley 26 is normally slack and does not transmit a driving force. A belt tightener 110 is provided as shown in FIG. 1 and having a pulley 111 mounted for swinging movement toward and away from the lower reach of belt 32. Tightener 110 is controlled by a lever 112.

Between wheels 16 and 18 and behind header 40, in underslung relation to frame 11, is a crop conditioner unit 115 having rolls 116 and 118. A drive sheave 119 is provided on the conditioner and operative through belts 120 and 121 to drive rolls 116 and 118, respectively. Sheave 119 is driven by a belt 122 connected to a pulley 124 on the outboard end of shaft 35.

The operator's seat on the machine is located substantially as shown in dotted lines in FIG. 2 and indicated S. It will be noted that the seat S is directly over central plane 25 of the machine, midway between the wheels 16 and 18 and directly behind central drive pulley 26. From such position, the operator is able to handle the windrower with optimum ease and efficiency.

With the drive arrangement described, the driving components are substantially symmetrical. As shown best in FIG. 2, the driving components to the right of central plane 25 have equivalent and corresponding components to the left of such central plane. Thus, the types of parts used are minimized. The parts of the respective drive components on one side are interchangeable with parts on the opposite side and the torque forces transmitted to the various drive components are equalized. The uniform distribution of these forces throughout the system provides desired wear and operation characteristics. Moreover, by having the drive shaft 22 of the engine 20 facing inwardly rather than outwardly, as conventional, the drive train between shaft 22 and the components of the windrower is located substantially along the middle of the machine. A substantial portion of the weight of the drive mechanism is thus shifted by this design from the left side of the machine toward the center of the structure whereby the overall implement has better weight balance, stability and maneuverability. Also, the output of power from central pulley 26 through the universal drive connections to the sickle and reel are symmetrical. This also applies to the drive to the draper units.

With the drive system described, the operator on top of frame 11 in seat S is located centrally between the ground wheels 16 and 18. He has a vantage point which gives him equal opportunity to see either end of the header 40. He is able therefore to closely follow the previously cut swath and maneuvering of the machine as facilitated. Likewise, the control levers to the planetary gear units and to the other components of the drive system are readily within his reach and control.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention what we claim is:

1. A windrower machine comprising, in combination, a frame, a pair of laterally spaced ground wheels supporting a forward end of said frame and a caster wheel supporting a rearward end in a location generally in trailing relation to one of said pair of wheels, a header mounted on said frame forward end and extending laterally relative thereto, a transversely reciprocable sickle and a reel carried on said header and extending from one side to the other of the header, an engine mounted on said frame between said forward and rearward ends and along the side of the frame toward said one ground wheel, said engine having an output drive shaft extending across a longitudinal central vertical plane substantially midway between said pair of ground wheels, said drive shaft extending parallel to the axes of said wheels, a main drive wheel supported on said frame forward end for rotation on an axis parallel to said shaft and in a vertical plane along said central plane, a drive train along said central plane connecting said engine shaft and said drive wheel, a pair of output elements projecting respectively from opposite sides of said drive wheel, a first drive connection between the output element at one side of said drive wheel to one side of said header, and a second drive connection between the output element at the other side of said drive wheel to the other side of the header.

2. A windrower machine as recited in claim 1 wherein said first drive connection links said drive wheel to said reciprocating cutter and including means for changing rotatable motion to oscillating motion.

3. A windrower machine as recited in claim 1 wherein said second drive connection links said drive wheel to said reel and including means reversing the direction of rotation of the output of the drive wheel element.

4. A windrower machine as recited in claim 1 wherein said first drive connection extends diagonally from a rearward end adjacent said central vertical plane to a forward end adjacent one side of said header and said second drive connection extends diagonally from a rearward end adjacent the central vertical plane to a forward end adjacent the opposite side of the header.

5. A windrower machine as recited in claim 4 wherein said first and second drive connections both have a pair of universal joints, one at each end of each connection.

6. A windrower machine as recited in claim 5 wherein said header has a pair of endless drapers, one at one side of the header and the other at the opposite side and spaced from each other to provide a discharge opening across said central vertical plane, both drapers having upper reaches which travel toward said central vertical plane, a first bevel gear means connecting one draper to said first drive connection, and a second bevel gear means connecting the other draper to said second drive connection.

7. A windrower machine as recited in claim 6 wherein each draper is driven from the laterally outboard end thereof and remote from said discharge opening.

8. A windrower machine as recited in claim 6 where each bevel gear means comprises a pair of bevel gears, one rotating on an axis perpendicular to said central vertical plane and one parallel thereto, the bevel gear of each gear means which rotates on the perpendicular axis being more remote laterally than its associated gear from said central vertical plane.

9. A windrower as recited in claim 8 wherein said one bevel gear of said first bevel gear drive has a shaft projecting laterally outwardly, and said drive connection to said reciprocating sickle including a flywheel and a wobble joint connecting the shaft to the sickle.

10. A windrower as recited in claim 8 wherein said one bevel gear of said second bevel gear drive has a shaft projecting laterally outwardly and carries a drive sprocket, said reel being driven from said drive sprocket and said means for changing direction of rotation including a chain carried on a pair of spaced sprockets, and the outside of one reach of the chain engaging the drive sprocket.

11. A windrower as recited in claim 10 wherein said drive chain drives an endless belt extending around a pair of sheaves, one coaxial with said reel and the other coaxial with one of said pair of sprockets, and one of said sheaves being an adjustable split sheave.

12. A windrower machine comprising a frame, a pair of laterally spaced coaxial ground wheels supporting a forward end of said frame and a caster wheel supporting a rearward end in a location generally in trailing relation to one of said pair of ground wheels, a header mounted on said frame forward end and extending laterally relative thereto, a transversely reciprocable sickle on said header, means on the header to receive cut material and convey it laterally for deposit in a windrow, an engine mounted on said frame between said forward and rearward ends and along the side of the frame toward said one ground wheel, said engine having an output shaft projecting across a longitudinal central vertical plane substantially midway between said pair of ground wheels and on an axis parallel to the wheel axis, first and second sheaves on said drive shaft, a main drive wheel supported on said frame forward end for rotation on an axis parallel to said shaft and in a vertical plane along said central plane, means including a drive belt connecting said first sheave to said drive wheel, said drive belt having an upper reach travelling rearwardly, means connecting said drive wheel to said sickle and to said header conveyor means, a jack shaft rotatably supported on said frame intermediate said output shaft and drive wheel and extending transversely, a sheave on said jack shaft, a drive belt connecting said engine second sheave to the jack shaft sheave and one of said sheaves at least being a split sheave, said drive belt having an upper reach travelling rearwardly, means connecting one end of said jack shaft to one of said ground wheels, and means connecting the opposite end of said shaft to the opposite ground wheel.

13. A windrower machine as recited in claim 12 wherein both of the connecting means between said jack shaft and said ground wheels includes means reversing the direction of rotation of the output of the ends of said jack shaft.

14. A windrower machine as recited in claim 12 wherein a tightener is carried on said frame and movable into and out of engagement with one reach of said drive belt, said drive belt rotating said main drive wheel only when said tightener is in belt engaging position.

References Cited by the Examiner
UNITED STATES PATENTS 2,677,225   5/1954   Ommadt _____ 56—23
2,850,861   9/1958   Miller _____ 56—23

ABRAHAM G. STONE, *Primary Examiner.*

ANTONIO F. GUIDA, *Examiner.*